United States Patent [19]

Kaufman et al.

[11] 4,005,613
[45] Feb. 1, 1977

[54] BRAKE OPERATING LEVER

[75] Inventors: Alan D. Kaufman, Williamsport;
Arne M. Reistad, Jr., Philadelphia;
David J. Wilke, York, all of Pa.

[73] Assignee: Pennsylvania Wire Rope Corporation, Williamsport, Pa.

[22] Filed: May 2, 1975

[21] Appl. No.: 573,926

[52] U.S. Cl. ................................................ 74/489
[51] Int. Cl.² .................. G05G 7/00; B62K 23/06; B62L 3/02
[58] Field of Search .......................... 74/488, 489

[56] References Cited
UNITED STATES PATENTS 3,176,536   4/1965   Altenburger ..................... 74/489

FOREIGN PATENTS OR APPLICATIONS 1,296,037   5/1964   Germany ........................... 74/489
458,361     7/1950   Italy .................................. 74/489

Primary Examiner—Allan D. Herrmann
Attorney, Agent, or Firm—Brady, O'Boyle & Gates

[57] ABSTRACT

An operating lever for cable or wire actuated bicycle brakes wherein the lever is pivotally connected to a housing through a pin and slot connection whereby the lever is movable from a normal operative position to an inoperative position to thereby slacken the brake wire.

7 Claims, 7 Drawing Figures

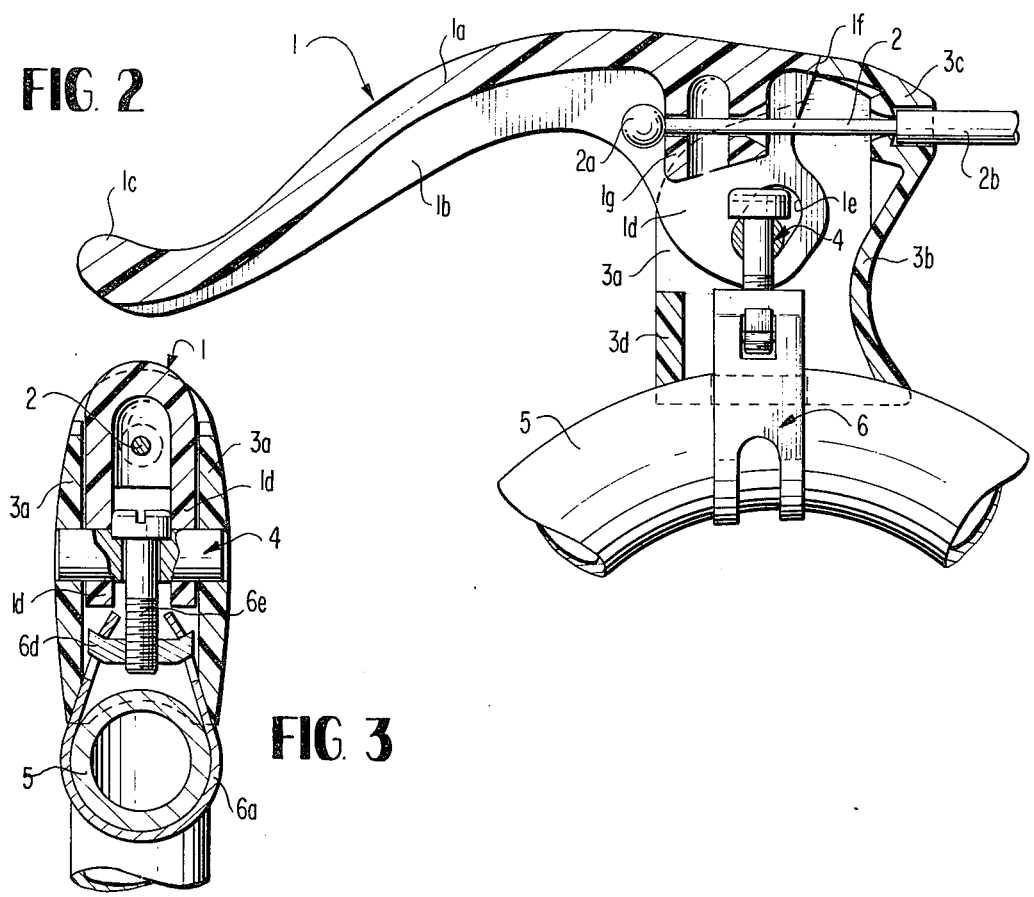
FIG. 2
FIG. 3
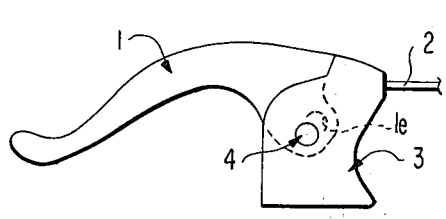
FIG. 4a
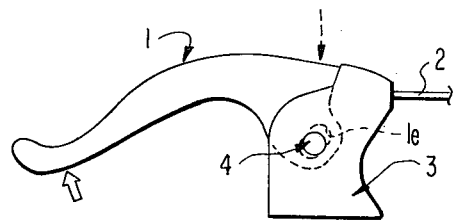
FIG. 4b
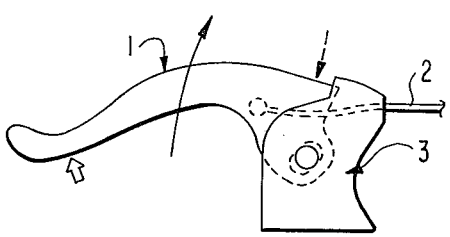
FIG. 4c
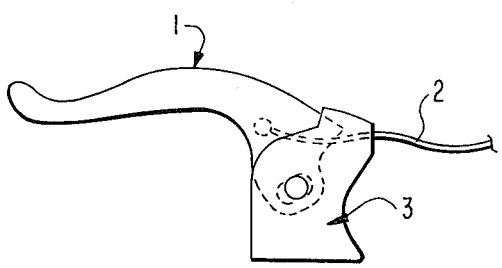
FIG. 4d

BRAKE OPERATING LEVER

BACKGROUND OF THE INVENTION

In conventional bicycle brakes having a lever connected to a wire which actuates a center-pull or side-pull type brake shoe which is pressed against the rim of the bicycle wheel when the brake is actuated, the clearance between the brake shoe and the rim is very small. This small clearance presents considerable difficulty when it is necessary to remove the bicycle wheel. In order to increase the clearance between the brake shoe and the rim, it is necessary to slacken the wire to thereby release the tension therein whereby the brake shoe can be manually pulled a further distance from the wheel rim.

At one time, it was necessary to disconnect the wire from the brake shoe in order to increase the distance between the brake shoe and the rim; however, the state of the art has progressed to obviate the necessity of disconnecting the brake actuating wire as evidenced by U.S. Pat. Nos. 3,176,536 to Altenburger dated Apr. 6, 1965 and 3,596,530 to Yoshigai dated Aug. 3, 1971. The brake operating levers disclosed in these patents include a latch, such as a spring biased detent or a pivotal member, which engages the housing to which the brake operating lever is pivoted whereby the brake lever is maintained in the normal operative position. When the latch is released, the lever is adapted to be pivoted inwardly of the housing to thereby slacken the brake actuating cable.

The brake operating lever of the present invention is an improvement over the brake operating levers of the type shown in the above-noted Altenburger and Yoshigai patents in that the pivotal connection between the brake lever and the housing in which it is mounted is constructed and arranged such that the lever is movable from an operative position to an inoperative position to slacken the brake cable, thus, the pivotal connection provides the two-fold function of providing the pivotal connection for the normal operation of the brake lever, and a release connection whereby the lever is movable to the inoperative position to thereby slacken the cable.

BRIEF DESCRIPTION OF THE DRAWINGS

FIG. 2 is a side elevational view, partly in section, of the brake operating lever in the operative position;

FIG. 3 is an end elevational view, partly in section, of the brake operating lever as shown in FIG. 1; and FIGS. 4a through 4d are schematic illustrations showing the manipulation of the brake operating lever from the operative position to the inoperative position for slackening the brake actuating cable.

DESCRIPTION OF THE PREFERRED EMBODIMENT

Figure 1:
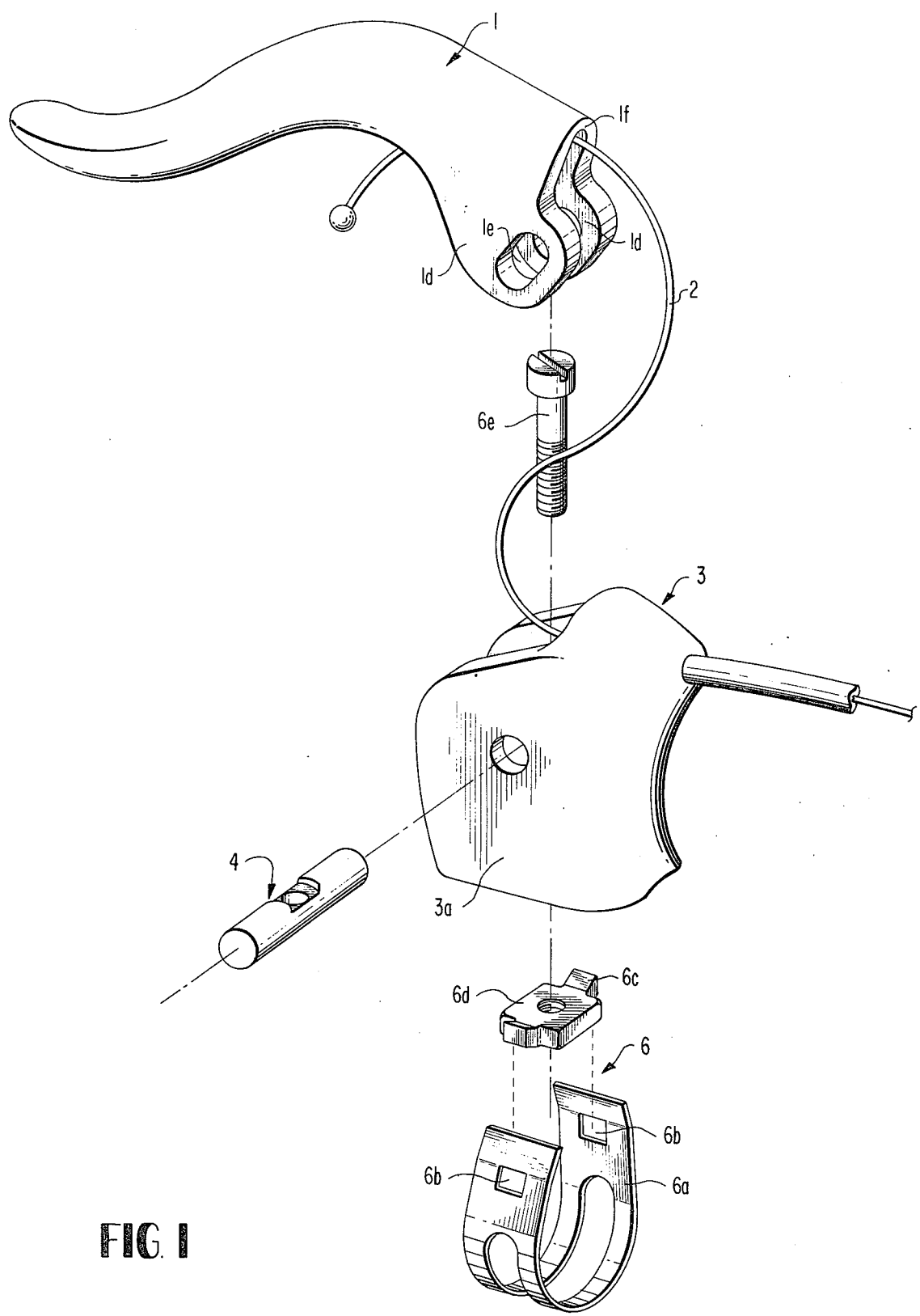
FIG. 1 is an exploded perspective view of the brake operating mechanism of the present invention.

Referring to the drawings and more particularly to FIGS. 1 and 2 thereof, the brake lever mechanism of the present invention comprises, essentially, a lever 1 connected to one end of a brake actuating cable 2 and pivotally connected to a support or housing 3 by a pin 4, the housing being rigidly connected to the bicycle handle bar 5 by a clamping strap assembly 6.

The lever 1 includes an arcuate body portion 1a having depending side walls 1b tapering rearwardly into a bulbous portion 1c. The forwardly extending portions of the side walls are enlarged to form ear portions 1d having aligned, inclined slots 1e for receiving the pivot pin 4. The front of the lever body portion is provided with an inclined edge 1f adapted to abut a similar edge on the housing 3 when the lever is disposed in the operative position. A depending wall portion 1g is provided between the lever side walls and is formed with axial bores for receiving the brake cable 2 having a fastening sphere 2a on its end.

The housing 3 includes a pair of side walls 3a, and an arcuate front wall 3b having a nose portion 3c formed with a countersunk bore for receiving the brake cable 2 and one end of the cable sheath 2b. A rear wall portion 3d extends between the side walls, the bottom edges of the rear wall and front wall being formed with an arcuate configuration to conform to the bicycle handle bar. As will be seen in FIG. 3, the ear portions 1d of the lever are positioned in the space between the side walls 3a of the housing.

The clamping strap assembly 6 comprises a strap 6a extending upwardly from the bottom surface of the handle bar and having apertures 6b for receiving outwardly extending tabs 6c provided on a nut 6d. The nut is adapted to receive a bolt 6e which extends through the pivot pin 4. By this construction and arrangement, the housing 3 and pivot pin are rigidly attached to the handle bar.

In the operation of the brake lever mechanism, as will be seen in FIGS. 2 and 4a, the tension in cable 2 will maintain the lever in the normal operating position so that the edge 1f of the lever abuts the edge of the housing and the position of the lever relative to the pivot pin remains as shown during the normal operation of the lever. When it is desired to relieve the tension in the cable to thereby slacken it, due to the pin and slot connection the lever may be moved in a clockwise direction as shown by the arrows in FIGS. 4b and 4c thus shifting the position of the lever relative to the pivot pin, whereby the front edge 1f of the lever is moved away from the edge of the housing thereby allowing the lever to move inwardly of the housing as shown in FIG. 4d.

It is contemplated to fabricate the handle 1 and housing 3 from a suitable plastic and the curvature of the handle is designed to readily fit the user's hand with the bulbous portion 1c provided to inhibit the user's hand from slipping off the end of the lever.

It is to be understood that the form of the invention herewith shown and described is to be taken as a preferred example of the same, and that various changes in the shape, size and arrangment of parts may be resorted to, without departing from the spirit of the invention or scope of the subjoined claims.

We claim:

1. An operating lever for a cable actuated bicycle brake comprising, a housing connected to a bicycle handle bar, a lever connected to one end of the brake actuating cable, and pin and slot means connected between the lever and the housing for pivotally connecting the lever to said housing, said lever having an edge portion adapted to abut an edge portion on the housing, the tension of the cable maintaining the lever in the operative position while in said abutting position with said pin means being disposed at one end of said slot means, the lever being movable from the operative, abutting position to the inoperative position within the housing wherein the pin means is disposed at the opposite end of the slot means, to thereby slacken the cable.

2. An operating lever according to claim 1, wherein the pin and slot means comprises, a slot formed in the lever and a pin secured to said housing and extending through said slot.

3. An operating lever according to claim 2 wherein the lever comprises an arcuate body portion having depending side walls tapering rearwardly into a bulbous portion, enlarged ear portions provided on the forwardly extending portions of the side walls, and a pair of aligned slots formed in the ear portion for receiving the pivot pin.

4. An operating lever according to claim 3, wherein a depending wall portion is provided between the lever side walls, and an axial bore formed in said wall for receiving the end of the brake actuating cable.

5. An operating lever according to claim 3, wherein the housing has a pair of side walls, the ear portions of said lever being disposed within said housing between the side walls thereof.

6. An operating lever according to claim 5, wherein the housing is formed with an arcuate front wall having a nose portion, and a countersunk bore formed in the nose portion for receiving the brake actuating cable and sheath.

7. An operating lever according to claim 6, wherein the housing and lever are fabricated from plastic.

* * * * *